Oct. 12, 1971 G. J. WICKSALL 3,611,479
ORIENTATION APPARATUS
Filed Sept. 2, 1969 3 Sheets-Sheet 2
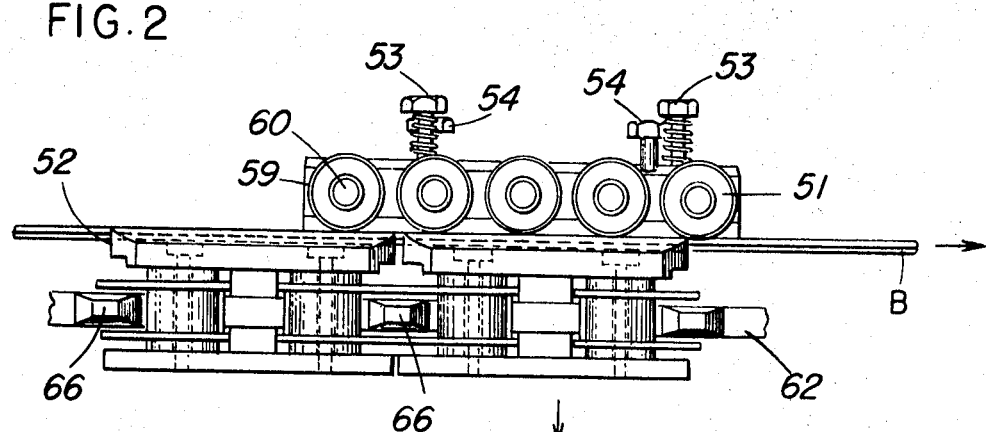
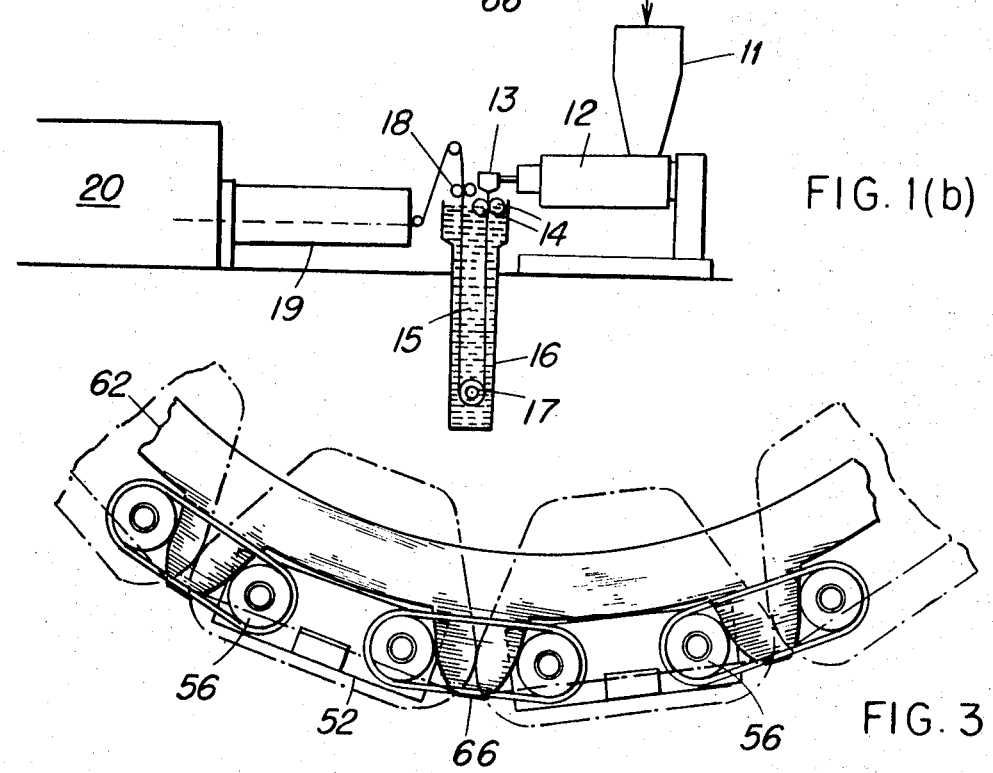
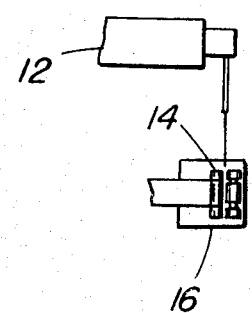
Inventor
Guy J. Wicksall Inventor
Guy J. Wicksall

United States Patent Office 3,611,479
Patented Oct. 12, 1971

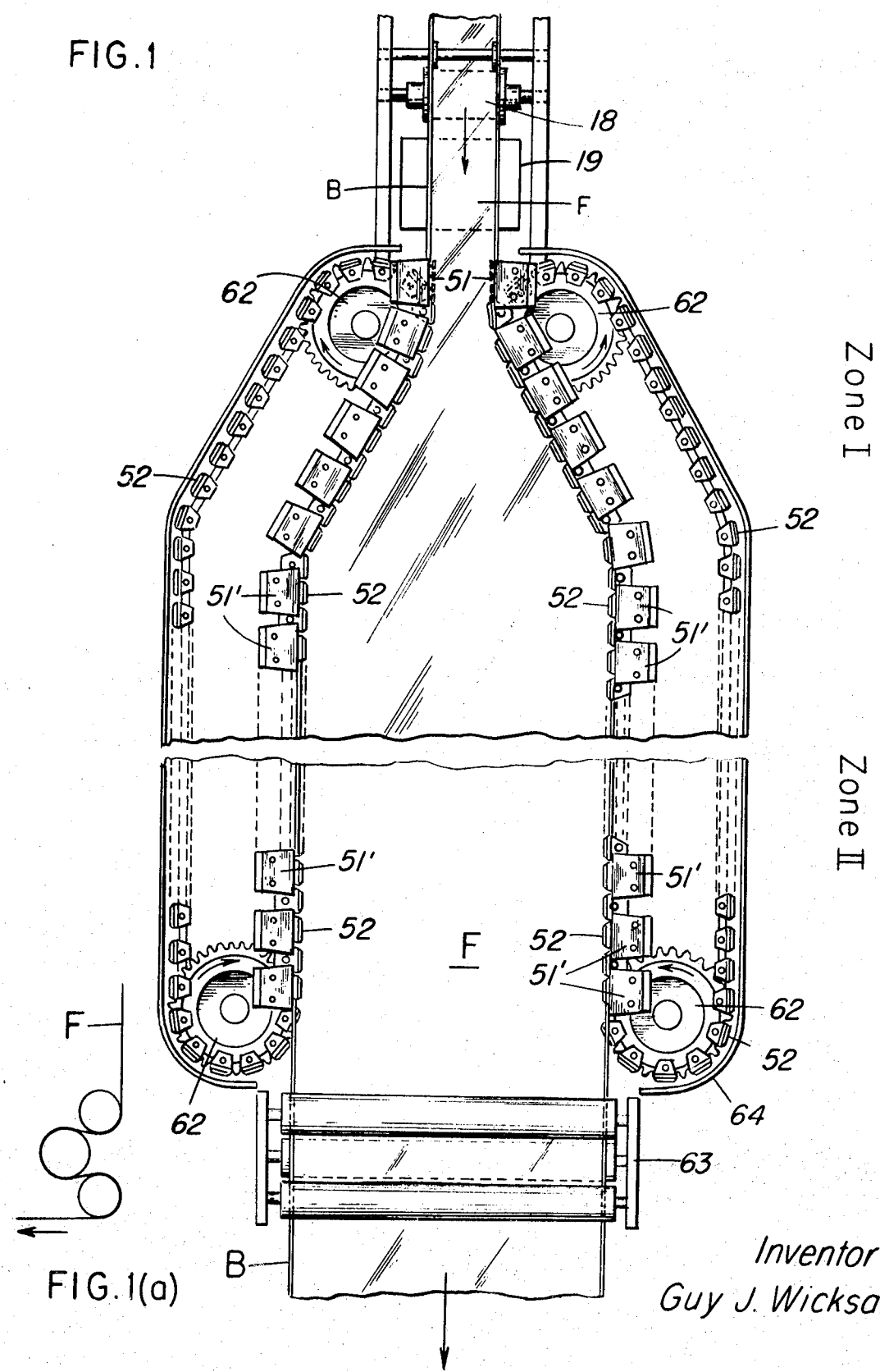

3,611,479
ORIENTATION APPARATUS
Guy J. Wicksall, Fayette, N.Y., assignor to
Mobil Oil Corporation
Filed Sept. 2, 1969, Ser. No. 854,547
Int. Cl. B29d 7/24
U.S. Cl. 18—1 FB                    2 Claims

ABSTRACT OF THE DISCLOSURE

An apparatus for restraining the edges of an advancing web of thermoplastic material being oriented which comprises a plurality of permanently mounted idler rollers in nipping engagement with a series of individually mounted clip plates carried on a continuously advancing chain member, and means biasing the rollers into nipping engagement with the clip plates, for nipping at the interface of the rollers and the clip plates the edges of the advancing web.

BACKGROUND OF THE INVENTION

(I) Field of the invention

The present application is directed to an improved apparatus for the production of biaxially oriented polypropylene films, including the biaxial orientation of a quenched polypropylene base web employing the sequential steps of extrusion, quenching, preheating and stretching sequentially in bilateral directions under carefully controlled conditions of temperature, stretching ratios and stretching rates in order to achieve optimum film characteristics including a high tensile modulus and exceptionally uniform gauge, with a minimum of gauge variation in the transverse and longitudinal directions thereof.

(II) Description of the prior art

The prior art discloses processes which teach distinct transverse and machine direction orientations as separate sequential operations under specific temperatures utilizing at least two separate pieces of equipment with a uniaxial orientation taking place in each piece of equipment, for example U.S. Pats. Nos. 3,217,073 and 3,511,495. In the prior art, the sum of both uniaxial orientations (one orientation step being conducted at 90° with respect to the other) yields a biaxially oriented film product.

SUMMARY OF THE INVENTION

In general, the present application is directed to an apparatus for the production of biaxially oriented polypropylene film which comprises a sequence of process steps under carefully controlled conditions of temperature, stretch ratios and stretch rates whereby an oriented film product is produced which exhibits properties far superior to oriented film heretofore produced in accord with the prior art techniques previously discussed. In particular, the present invention provides a method for the production of biaxially oriented film wherein both the transverse and the machine direction orientation steps are performed within the confines of a single orienting chamber such as, for example, a textile type tenter frame, which frames are commonly employed to effect only transverse orientation of thermoplastic films. The present orientation method differs from the prior art techniques commonly employed in that both the transverse and machine direction orientations are accomplished in what has been previously described in the prior art as the transverse direction orienter. In accord with the method of the present invention, the requisite orientation temperatures which are maintained within the confines of the enclosed tenter utilizing, for example, heated air, enables both the transverse and longitudinal orientation process to be accomplished under conditions eliminating certain precise stepwise temperature controls required by prior art processes wherein the transverse orientation was effected in a chamber separate from the machine direction orientation chamber. Film non-uniformity, such as gauge variation, primarily resulting from temperature non-uniformities, is accordingly minimized. The present method eliminates the sequential steps of heating, cooling and reheating, commonly practiced in the prior art, whereby the orientation process control is accordingly considerably simplified.

The orientation process of the present invention may be better understood by reference to the following sequential process steps:

(I) Extrusion and quench

Polypropylene resin is extruded in the form of a base web into a set of rotating, spaced, temperature controlled rollers and through said rollers into a liquid cooling medium or quench bath. The rollers may be partially submerged in a liquid cooling bath so that the extrudate emerges from the rollers directly into the liquid cooling medium, or the rollers may be positioned above the liquid cooling bath, in which case the extrudate emerges in air immediately prior to immersion in the quench bath. In the latter case, care is taken to minimize or substantially eliminate water carry-over onto the film surface by the partially submerged rollers by the employment of squeegee devices and/or air knives directed against the roller surfaces.

(II) Preheat

Uniformly preheating the polypropylene base sheet to a temperature above about 280° F. and preferably to a temperature within the range of from about 285 to about 315° F. but below the temperature at which the base polypropylene sheet loses sufficient mechanical strength to withstand the stresses imparted during the transverse stretching step.

(III) Transverse orientation

Stretching the base polypropylene sheet in a transverse direction at least 400% by gripping the film at each edge and increasing the distance between said edges as the film is moved in a longitudinal direction. While the film is being stretched in the transverse direction, the film is completely enclosed in a textile type tenter frame and is heated during the transverse stretching step utilizing, for example, infrared radiation or hot air circulating from plenums located within the tenter. The air temperature within the tenter oven may range from about 300 to 450° F. and preferably from about 350 to 400° F.

(IV) Longitudinal orientation

The transversely stretched film is immediately stretched lengthwise at least 400% while restraining its edges to prevent spontaneous lateral contraction thereof. The longitudinal orientation is achieved by a set of S-wrap rollers located outside of the tenter enclosure which are operated at speeds which cause the film to be stretched after passing from the diverging section of the tenter into the machine direction orientation section where the edges of the film are maintained in substantially parallel relationship. During the lengthwise stretching of the film, the temperature thereof may be maintained at approximately the same temperature as that employed during the transverse direction orientation. Dependent upon desired final film physical properties the machine direction orientation film temperature may alternatively be maintained slightly above or below, within 10° F., of the film temperature during transverse direction orientation.

BRIEF DESCRIPTION OF THE DRAWINGS

FIG. 1 is an overhead view, largely diagrammatic, of a portion of the orientation apparatus of the present invention showing in particular the arrangement, within the confines of the tenter frame, employed to effect transverse and longitudinal direction stretching of the film.

FIG. 1(a) is a side elevational view of the machine direction draw rollers shown in FIG. 1.

FIG. 1(b) is an illustration, largely schematic, of a side elevational view of the base film extrusion and quench system which may be employed in the method of the present invention.

FIG. 1(c) is a schematic overhead view of the base web forming rollers illustrated in FIG. 1(b)

FIG. 2 is a fragmentary, side elevational view of a section of the edge restraining mechanism employed to restrain the film edges during the transverse and longitudinal direction stretching operation being engaged by one of the rotating sprocket members illustrated in FIG. 1.

FIG. 3 is an overhead view, largely schematic, of a portion of the edge restraining mechanism being engaged by the sprocket members illustrated in FIG. 1.

DESCRIPTION OF SPECIFIC EMBODIMENTS

Figure 4:
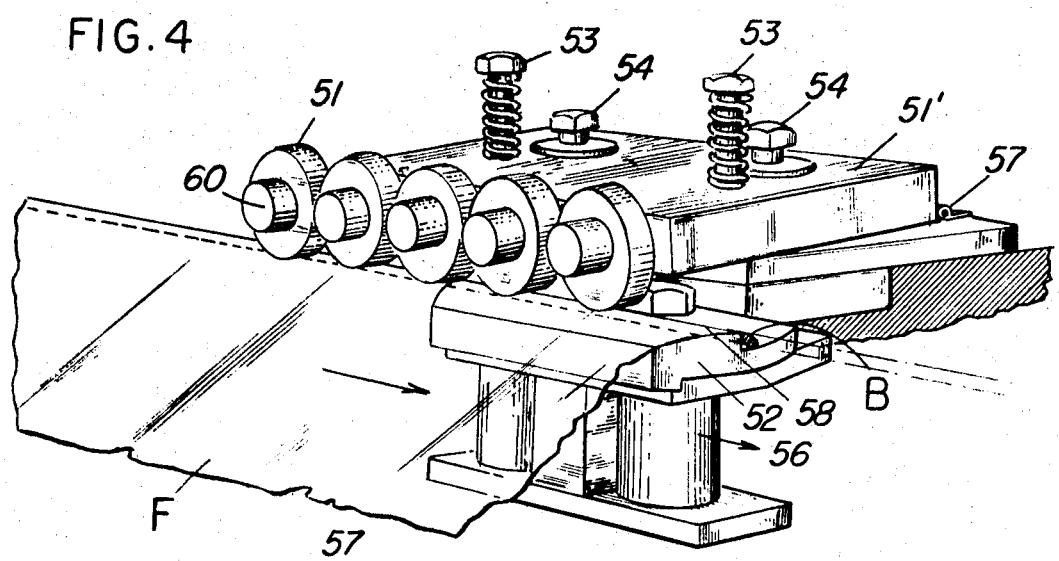
FIG. 4 is an enlarged fragmentary view of a section of the edge restraining mechanism illustrated in FIG. 1 showing engagement thereof with the film material being oriented.

As hereinbefore discussed, the orientation method of the present invention comprises the sequential steps of extrusion of a polypropylene melt; passage of the melt through a spaced set of calender rolls and into a quench bath; preheating the polypropylene base web to a suitable orientation temperature; stretching the base sheet initially in the transverse direction and immediately thereafter subjecting the transversely stretched base sheet to a machine direction draw within the confines of a single orientation chamber, such as a tenter frame for example. Applicant has found that orientation in biaxial directions utilizing a single orientation chamber is facilitated by the employment of the novel edge restraining mechanisms employed in the method of the present invention which will be more fully described hereinafter. More importantly, the method of the present invention allows production of a biaxially oriented film product having extremely uniform gauge and excellent tensile modulus properties.

A better understanding of the method of the present invention may be had by reference to the accompanying drawings and in particular FIG. 1 thereof which illustrates base film F as it passes through the orientation apparatus of the present invention. It will be noted in FIG. 1 that the tenter enclosure 64 has only been schematically represented for purposes of clarity to illustrate the method employed in the present invention. The base film is formed by extrusion of a polypropylene melt through a specially designed die orifice which regulates the flow of molten polymer whereby the molten base web which emerges from the die orifice is characterized by having continuous edge beads or enlarged bulbulous portions running along the opposite longitudinal edges thereof. Subsequently the base web is passed into a rotating set of nip rollers 14 which are partially submerged in water bath 16. At least one of the nip rollers is provided with a pair of circumferentially extending recesses at opposite ends thereof which accommodate the excess molten material at opposite edges of the extruded base web and further assist in defining a thickened longitudinal edge bead on opposite sides of the base web area, as the longitudinally extending bead portion identified as B in FIG. 1. The extrusion and bead formation operation having been completed, the base web is continuously withdrawn from the water bath by means of take up rollers 18 and subsequently passed through preheat section 19 which comprises an infrared oven employed to uniformly preheat the quenched base web prior to passage thereof into zone 1 of the tenter. In zone 1 of the tenter, the beaded edges of the film are engaged by the edge bead restraining mechanism which is more clearly illustrated in FIGS. 4, 5 and 6 and described in detail hereinafter. After the beaded edge is engaged by the edge restraining mechanism, a portion of which is carried on a continually rotating endless chain, the film is stretched in a transverse direction in zone 1 of the tenter enclosure as illustrated in FIG. 1 by virtue of the divergence of the edge restraining mechanisms. As the transversely stretched film continually progresses from zone 1 to zone 2 of the stretching mechanism illustrated in FIG. 1, the edges of the film are brought into substantially parallel relationship by virtue of the convergence of the edge restraining mechanism to such a parallel relationship In zone 2, the transversely stretched film is stretched in the longitudinal direction by virtue of the machine direction draw rollers 63 located immediately adjacent the exit end of the tenter enclosure. The draw rollers 63 are operated at a higher speed than continuous tenter chain 62 whereby longitudinal stretch is imparted to the base web in zone 2. It will be noted that substantially no longitudinal stretch is imparted to the film F in zone 1 of the stretching mechanism by virtue of the divergence therein of the film edges whereby the stretching forces applied to the film by rollers 63 are only able to act on the film F in zone 2 wherein the edges of the film assume a parallel relationship and the restrained film edges are free to longitudinally slide through the edge bead restraining mechanism. Further, it will be noted that during both the transverse direction stretching and the longitudinal direction stretching, the edges of the film are continually restrained whereby, as contrasted to prior art processes described hereinbefore, the transversely stretched film is not allowed to neck in intemediate transverse direction zone 1 and longitudinal stretching zone 2, which neck-in may result in undesirable final film physical properties.

As the biaxially oriented polypropylene film is withdrawn from machine direction stretch rollers 63, the arrangement of which rollers is more clearly illustrated in FIG. 1(a) which is a side elevational view of rollers 63, the edge beads of the film are trimmed off and returned to the base web extruder 12 as recycle material and the trimmed film is passed onto further processing such as surface treatment, coating or annealing for example.

Figure 5:
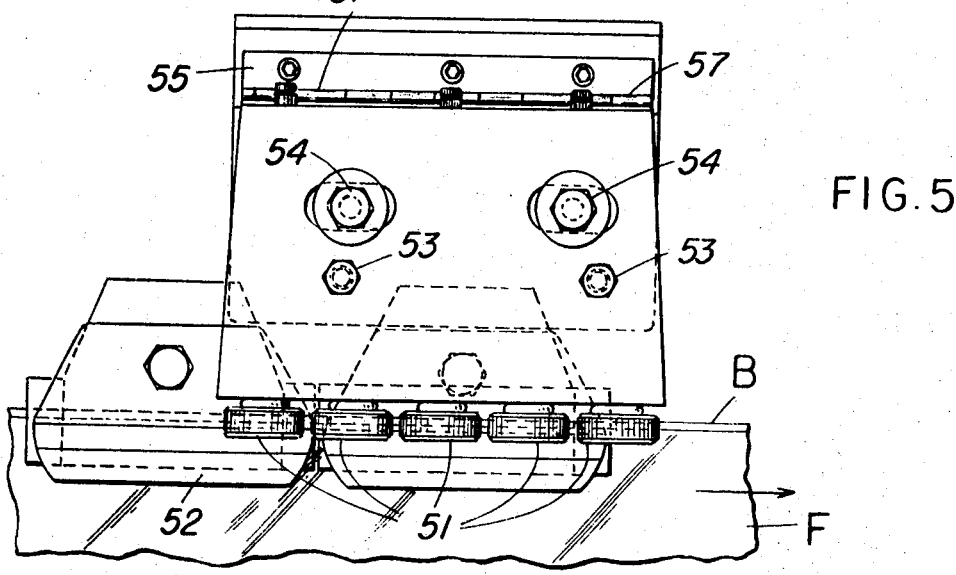
FIG. 5 is an overhead view of the edge restraining mechanism illustrated in FIG. 4.
Figure 6:
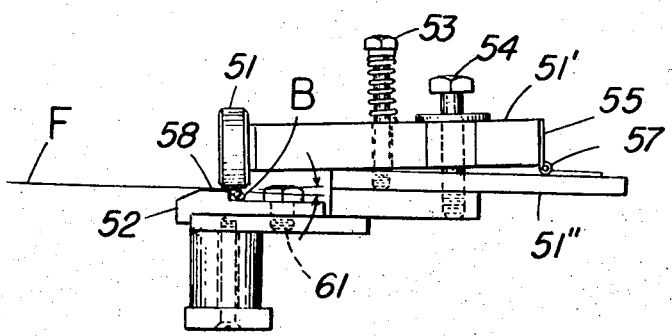
FIG. 6 is an end elevational view of the edge restraining mechanism illustrated in FIG. 4.

The edge bead restraining mechanism hereinbefore discussed which is employed in the orientation process of the present invention is more clearly illustrated in FIGS. 4, 5 and 6. The mechanism comprises a continuous series of nip rollers 51 which are mounted on shaft members 60. Nip rollers 51 rotate around internal bearing race 59. A continuous series of nip rollers 51 which are spaced close together extend in a longitudinal direction on both sides of the tenter enclosure. When the base film is threaded into the tenter enclosure, the longitudinal edge bead carried along opposite sides of the base film is threaded beneath nip rollers 51 and engaged on its undersurface by clip plate member 52 which bears in nipping relationship against nip rollers 51. Clip plate 52 is characterized by having clip plate surface 58 whereby the edge bead is restrained behind the nip formed by clip plate surface 58 and nip rollers 51. Clip plate member 52 is mounted, for example by bolt member 61, on a continuous link chain 56. In operation, the series of freely rotating nip rollers 51 are stationary, i.e. they are permanently mounted on longitudinally extending tenter rails (not shown) and are free to rotate but do not move in a longitudinal direction Conversely, clip plate 52 mounted on link chain 56 is continually advancing with the forward movement of the film, while retaining the bead edge during its course through the enclosed tenter assembly.

Nip rollers 51 are mounted on nip roller plate 51'. As more clearly illustrated in FIG. 6, the movement of nip roller plate 51 in a vertical direction is limited by the positioning of adjustable nip gap stop member 54. The amount of pressure it is desired to employ to insure adequate retention of the edge bead in the nip formed by nip roller 51 and clip plate surface 58 may be adjusted utilizing the spring-loaded, nip pressure adjusting member 53 which extends through nip roller plate 51' and nip roller base plate 51''. Nip roller plate 51' and nip roller base plate 51'' are joined together by hinge member 57 and hinge plate members 55. Accordingly, in operation, as the film advances through the edge bead restraining mechanism within the tenter enclosure, the edge restraining mechanism of the present invention, in addition to positively restraining the edge bead, accommodates to any gauge fluctuation along the base web portion adjacent the edge bead whereby nip roller 51 is free to move in a vertical direction while still maintaining desirable edge bead restraining pressure at the nip by virtue of spring-loaded, nip pressure adjusting member 53. Pairs of rotating sprocket wheels 62 located at the entrance and at terminus of the tenter enclosure engage and drive continuous link chains 56 during the course of their travel through the tenter enclosure as they advance clip plates 52 through the tenter and carry them on their return travel to the tenter entrance.

Example 1

Eighty percent, based upon the total weight of feed stock of virgin polypropylene resin pellets identified by the manufacturer as Eastman Tentite 423–DF, and having the following properties:

Melt index—4.5
Crystalline melting point, °F—330
Inherent viscosity—1.4–1.6
Molecular weight—100,000–120,000
Density (grams/cc.)—0.902
Vicat softening point, °F—293 were admixed in mixer 38 illustrated in FIG. 1, with 20% by weight of chopped polypropylene edge bead trim recycle material and fed through resin feed hopper 11 and into extruder 12. Extruder 12 was a standard 2½ inch extruder with a 20/1 length to diameter ratio. The barrel temperature of extruder 12 was maintained, adjacent the feed zone thereof, at 375° F. The temperature of the barrel and extruder 12 at a point immediately adjacent die 13 was approximately 425° F. The extruder head pressure was maintained at about 1160 p.s.i. and the screw speed of the extruder was 50 r.p.m. The temperature of the polypropylene melt as it was extruded through die 13 was approximately 409° F. Upon emerging from the die orifice, the polypropylene base web was passed into the nip formed by counterrotating rollers 14. Die orifice 13 was positioned a distance of approximately 1.75 inches from the nip formed by rollers 14. Rollers 14 were spaced approximately 26.5 mils apart and were rotated at a speed of approximately 8.6 feet per minute. As shown in FIG. 1(b), rollers 14 were immersed halfway, i.e. up to a point approximately at the center of their axis of rotation, in water bath 15. Care was taken to insure that the nip was essentially free from water carry-over, e.g. by the employment of squeegee rollers and/or air knives, for example (not illustrated). The base polypropylene web was calendered to a thickness of approximately 26.5 mils after passage through rollers 14 and emerged from the nip of rollers 14 at a point below the water level of bath 15. Water bath 15 was maintained at a temperature of about 65° F. Roller 14a was provided with a pair of circumferentially extending recesses on the surface thereof which accommodate the edge beads along the longitudinal edges of the base web and serve to more definitely define such beads as illustrated in FIG. 1(c) before the base polypropylene web was submerged in quench tank 16. The quenched, extruded base web was fed around roller 17 located near the bottom of quench tank 16 through takeoff rollers 18 and into preheat tunnel 19. The temperature of the infrared energy sources employed within the preheat tunnel was approximately 750° F. and the film temperature as the film emerged from the exit end of the preheat tunnel prior to entry thereof into tenter 20 was approximately 298° F. The preheat tunnel 19 utilized infrared radiation as a heat source having heaters both above and below the base web. The heaters are designed to provide more radiant energy to the edge beads which have a larger mass than the center web. As the base polypropylene web entered zone 1 of tenter 64, the longitudinal edge beads on the web were grasped by the edge restraining mechanism illustrated in FIG. 4. As more clearly illustrated in FIG. 1, the polypropylene base web was immediately stretched in a transverse direction upon entry into tenter 64 by reason of the divergence of the edge restraining mechanism 52. The air temperature within tenter 20 was maintained at approximately 377° F. and the polypropylene base web was stretched in zone 1 of tenter 20 by a ratio of approximately 8:1. As shown in FIG. 2, in zone 2 of tenter 20, i.e. the zone in which machine, i.e. longitudinal, direction orientation is imparted to the transversely stretched base web emerging from zone 1 of tenter 64, the edge restraining mechanisms 52 assume a substantially parallel relationship whereby no additional significant transverse direction stretch is imparted to the transversely stretched film. The film was stretched longitudinally in zone 2 by a ratio of 6:1. The final gauge of the biaxially oriented polypropylene film product was approximately 0.6 mil.

In the following examples, i.e. Examples II, III and IV, various other polypropylene resins, identified by their manufacturers as Tenite 422D (Example II); Profax PC493 (Example III); and Shell 5520F (Example IV) were extruded and oriented following the procedure as described in Example I. The same extrusion, quench and orientation apparatus were used in each of the examples. The extrusion, quench and orientation process conditions employed for Examples II, III and IV are outlined in following Table II. Table I lists the physical properties of the resins employed in Examples II, III and IV.

TABLE I

| Resin | Melt index | Crystalline melting pt. (° F.) | Inhernet viscosity | Molecular weight | Density (g./cc.) | Vicat softening point (° F.) |
|---|---|---|---|---|---|---|
| Tenite 422DF (Ex. II) | 2.7 | 318 | 1.6 | 110,000 | .902 | 293 |
| Profax PC 493 (Ex. III) | 2.8 | 333 | 3.4 | 345,000 | .904 | 306 |
| Shell 5520F (Ex. IV) | 4.2 | 333 | 2.0 | 410,000 | .905 | 305 |

TABLE II

| Example | Tenite 422D (II) | Profax PC 493 (III) | Shell 5520F (IV) |
|---|---|---|---|
| Extruder barrel temperature adjacent feed zone (° F.) | 400 | 400 | 370 |
| Extruder barrel temperature adjacent die (° F.) | 450 | 450 | 390 |
| Extruder heat pressure (p.s.i.) | 1,300 | 2,975 | 2,875 |
| Extruder screw speed (r.p.m.) | 46 | 57 | 58 |
| Extrusion on melt temperature (° F.) | 442 | 443 | 402 |
| Water bath temperature (° F.) | 44 | 44 | 65 |
| Preheat tunnel (infrared heat source temperature—° F.) | 798 | 812 | 802 |
| Film temperature on exit from preheat tunnel (° F.) | 307 | 300 | 297 |
| Air temperature in orientation tenter (° F.) | 373 | 372 | 377 |
| Stretch ratio (mechanical): | | | |
| (a) Transverse direction | 8:1 | 8:1 | 8:1 |
| (b) Longitudinal direction | 6.1:1 | 6.1:1 | 5.6:1 |
| Gauge of biaxially oriented film (mils) | .50 | .44 | .59 |

The following Table III is a tabulation of the physical properties of the biaxially oriented film products produced in accord with the method of the present invention.

TABLE III.—PHYSICAL PROPERTIES OF BIAXIALLY ORIENTED POLYPROPYLENE FILM

| | Produced in accordance with the procedure of— | | | |
|---|---|---|---|---|
| Example | I | II | III | IV |
| Modulus (p.s.i. $\times 10^{-3}$)[a] | MD-512 TD-354 | MD-487 TD-370 | MD-500 TD-468 | MD-491 TD-451 |
| Elongation (percent)[a] | MD-58 TD-70 | MD-41 TD-56 | MD-47 TD-58 | MD-68 TD-77 |
| Ultimate tensile (p.s.i. $\times 10^{-2}$)[a] | MD-282 TD-215 | MD-262 TD-233 | MD-240 TD-248 | MD-219 TD-202 |
| Impact strength, cm.-bg./ml. at 72° F | 17.4 | 24.3 | 15.8 | 13.1 |
| Haze [b] | 1.7 | 1.7 | 1.9 | 1.4 |
| Gloss [c] | 79.4 | 83.6 | 80.4 | 81.0 |

A.S.T.M. test numbers:
[a] D-882-67.
[b] D-1003-61.
[c] D-2457-65T.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. An apparatus for restraining the edges of an advancing web of thermoplastic material, whereby positive restraint of said edges is maintained while stretching said web, which comprises: a plurality of permanently mounted stationary idler rollers and in nipping engagement therewith a series of individually mounted clip plates carried on a continuously advancing chain member, means biasing said rollers into nipping engagement with said clip plates, for nipping at the interface of said rollers and said clip plates the edges of said advancing web.

2. An apparatus for restraining the beaded edges of an advancing web of thermoplastic film, whereby positive restraint of said edges is maintained while stretching said web, which comprises: a plurality of permanently mounted stationary idler rollers and in nipping engagement therewith a series of individually mounted clip plates carried on a continuously advancing chain member, means biasing said rollers into nipping engagement with said clip plates, for nipping at the interface of said rollers and said clip plates the edges of said advancing web immediately adjacent said bead.

References Cited

UNITED STATES PATENTS

| 3,055,048 | 9/1962 | Koppehele | 18—1 FB |
| 3,305,889 | 2/1967 | Lewis et al. | 18—1 FB |

FOREIGN PATENTS

| 892,490 | 3/1962 | Great Britain | 18—1 FB |

J. SPENCER OVERHOLSER, Primary Examiner

D. S. SAFRAN, Assistant Examiner

U.S. Cl. X.R.

18—1 FM